Dec. 11, 1962  G. H. DOERRIES ETAL  3,067,626
TRANSMISSION
Filed March 22, 1960  2 Sheets-Sheet 2
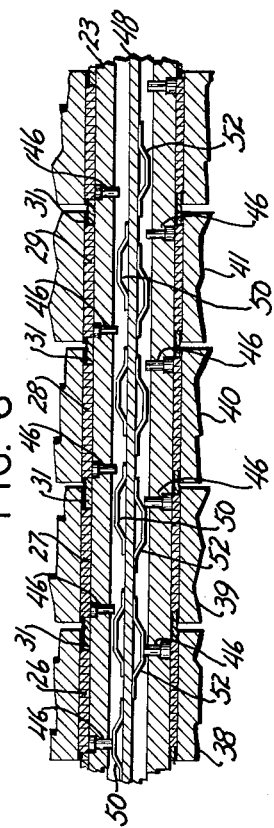
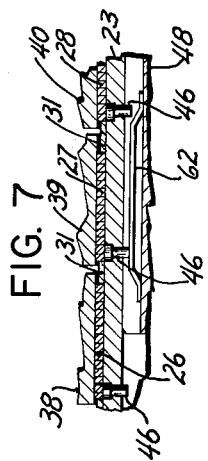
INVENTORS
GEORGE H. DOERRIES
GODFREY B. SPEIR
BY William V. Eby
ATTORNEY 3,067,626
Patented Dec. 11, 1962

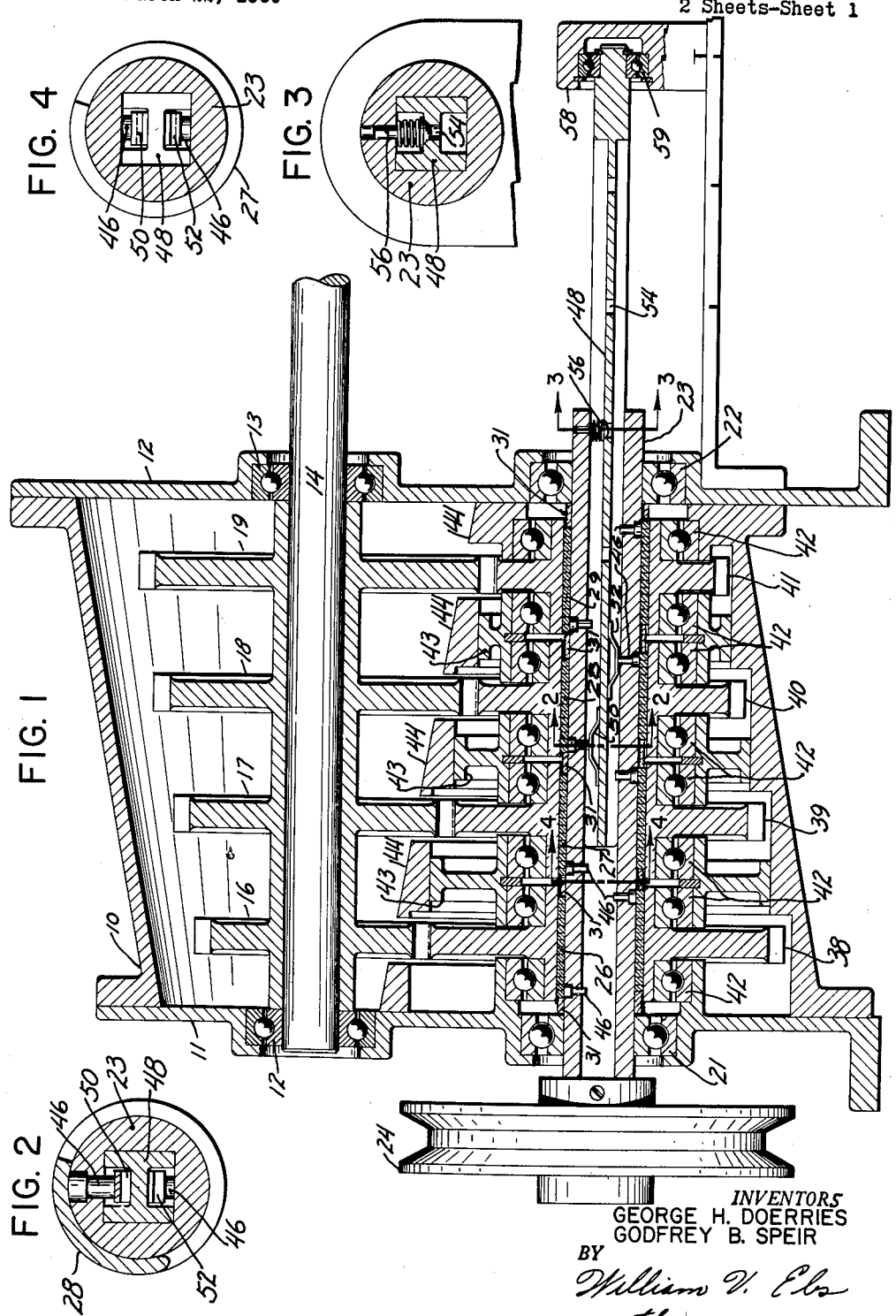

3,067,626
TRANSMISSION
George H. Doerries, and Godfrey B. Speir, West Caldwell, N.J., assignors to Curtiss-Wright Corporation, a corporation of Delaware
Filed Mar. 22, 1960, Ser. No. 16,840
3 Claims. (Cl. 74—372)

This invention relates to mechanical power transmission equipment and is concerned particularly with improvements in variable ratio power transmission equipment whereby the speed relationship between a driving shaft and a driven shaft may be selectively adjusted.

In general, the invention includes a transmission shaft having associated therewith a plurality of compact selectively engageable spring clutches, each clutch being embraced by a separate transmission member such as a gear. The clutches are so arranged as to be selectively engageable with one or another of the annular members so that any one of the annular members may be connected in drive relationship with a mating annular member or gear.

An object of the invention is to provide a compact high capacity multi-step gear transmission mechanism.

A further object is to provide a multi-step transmission mechanism wherein shifting from one ratio to another may be afforded without relinquishing driving effort.

A further object is to provide a spring clutch multi-step transmission capable of bi-directional and overlapping drive.

A further object is to provide a spring clutch driving mechanism between a shaft and embracing member which is selectively operable to drivably couple the shaft and member.

A still further object of the invention is to provide a spring clutch multi-step transmission mechanism wherein the spring clutch elements are rendered operative for driving coupling by radially outward movements of one or the other ends of each spring to engage a co-acting transmission element.

The nature of the invention may be better understood by reference to the attached drawings wherein similar reference characters indicate similar parts and wherein:

FIG. 1 is a longitudinal section through a multi-step transmission incorporating features of the invention, FIGS. 2, 3 and 4 are sections respectively on the lines 2—2, 3—3, and 4—4 of FIG. 1, FIG. 5 is an enlarged fragmentary view of a shaft element showing the arrangement of spring clutches thereon, FIG. 6 is a fragmentary axial section of a portion of a transmission incorporating alternative means for its control and FIG. 7 is a fragmentary longitudinal section somewhat like FIG. 6 showing another alternative mode of control.

Referring first to FIGS. 1–4, our transmission includes a central housing 10 having end plates 11 and 12, the latter including bearings 12 and 13 in which a shaft 14 is journalled. Shaft 14 may comprise either a driving or a driven shaft, this shaft carrying a plurality of gears 16, 17, 18 and 19. These gears may be all joined together as shown or may comprise separate gears appropriately secured to rotate with the shaft 14. As noted, the gears are of different sizes. The end plates 11 and 12 also carry bearings 21 and 22 in which is journalled a shaft 23, said shaft carrying a pulley or other transmission element 24 at one end externally of the housing, for useful transmission of power to or from a load or a power source respectively.

As shown also in FIG. 5, shaft 23 is embraced by a plurality of clutch springs 26, 27, 28 and 29, these springs being similar to one another and being wound in the same direction. These springs are separated from one another by abutment members 31, each of which is secured for rotation with the shaft 23 and each of which has its ends conformed as at 33 to the helical form of the end of the adjacent spring. Also, each element 31 includes abutment shoulders 34 for abutting engagement by the squared-off end of the adjacent spring, so that drive to or from shaft 23 may be imparted between the spring and the element 31 through the abutment shoulder 34. The abutment shoulders 34 are so spaced circumferentially relative to the springs and to one another so that there is slight end clearance noted at 36 between one end of the spring and the abutment shoulder 34 when the other end of the same spring is in engagement with its abutment shoulder. Thus, each spring has slight rotational freedom on the shaft with respect to the abutment elements 31.

The springs 26—29 are embraced respectively by gears 38, 39, 40 and 41, the gears 38—41 having continuous meshing engagement with respective gears 16—19. Also, bearings 42 are provided for each of the gears 38—41, secured in bearing mountings 43, in turn secured in the housing 10 by bearing supports 44. These supports in the members 43 may be of different sizes to equalize space and bulk, as shown. Alternatively, it would be feasible to design these elements so that they are similar in size, for parts standardization. For any design, facile assembly of the components is provided for.

To enable clutching of any one of the gears 38—41 to the shaft 23, the respective spring clutches 26—29 are individually energized. The arrangement for energizing each spring is duplicated for the other springs. Adjacent each end of each spring the wall of the shaft 23 is drilled to receive a button 46. Each button comprises an enlarged outer portion seated in a counterboard shaft opening, and a stem portion which projects inwardly into the hollow of the shaft 23. As shown in FIGS. 2, 3 and 4 the shaft hollow is preferably rectangular in section and receives a sliding bar 48 of H cross-section. On one side of the web of this bar is secured a spring lifter 50 which, according to bar position in the shaft 23, engages the inner end of a button 46, pressing it outwardly and elastically into engagement with the end of the spring coil. Referring to FIG. 2, a section on the line 2—2 of FIG. 1, the button 46 presses the end of the spring 28 outwardly into engagement with the bore of the gear 40. If it be assumed that rotation of the shaft 23 is clockwise in FIG. 2, and that the gear 40 is either not rotating or rotating slower than the shaft, the end of the spring 28 will be engaged frictionally with the bore of the gear and the friction will cause the spring 28 to unwrap, and progressively all turns of the spring will be expanded into driving engagement with the gear 40. The triggering force on the spring end is small compared with the torque capacity of the unwrapped spring, which tends to be selfenergizing to handle large torque, depending on the number of turns and the dimensions of the spring. The drive reaction from the spring will then be imposed upon the abutment shoulder 34 secured to the shaft and at the opposite end of the spring 28. Thereupon, the gear 40 will be clutched to the shaft 23 and unitary drive between the shaft 23 and the gear 40 will be enforced. Should the gear 40 tend to overrun the shaft, the spring 28 will wind down on the shaft, disengaging the drive. So long as the button 46 presses the spring end outwardly, the spring clutch 28 will always be ready to drive the gear 40.

If it is desirable to have a bi-directional drive, a spring lifter 52, like the lifter 50, is secured on the opposite side of the web of the bar 48 to engage the button 46 lying under the opposite end of the spring clutch 28. With this arrangement, both ends of the spring clutch are forced into resilient frictional engagement with the bore of the gear 40 so that upon reversing the direction of rotation of the gear 40 or of the shaft 23, the spring clutch will be triggered from one end or the other to unwrap into the bore of the gear and to drive from the appropriate abutment shoulder 34 from the shaft 23.

By shifting the bar 48 axially through the shaft 23, buttons 46 for any one of the springs 26—29 may be picked up to enable a driving connection between the shaft 23 and the respective gears 38—41.

If it be assumed that shaft 14 is the input member and shaft 23 the output, the several gears 16—19 drive the several respective gears 38—41. By shifting the bar 48 any one of the gears 38—41 may be clutched to the shaft 23 enabling drive from the shaft 14 to the shaft 23 at a speed ratio depending upon the meshed gears which are in operation. The other gears, not in driving engagement, merely spin free until they themselves may be clutched for driving relation.

The spring lifters 50 and 52 are preferably arranged with ramps at each end, as shown, to enable pickup and dropout of the several buttons 46 as the bar 48 is shifted axially. This bar may have holes 54 drilled through its web for engagement by a spring detent 56 at the end of the shaft 23, whereby the detent will hold the bar in a proper position of adjustment. Since the bar 48 rotates with the shaft 23, its free end may be carried in a block 58 through a bearing 59, the block being utilized to shift ratios of the gearset by positioning it rightwardly or leftwardly. Any other suitable means, either manual or automatic may be used for regulating shift of gear ratios.

In the FIG. 1 embodiment, each clutch spring is picked up individually and there is no overlap in shift from one ratio to the next. In the arrangement of FIG. 6, spring lifters 50 and 52 may be pluralized, as shown, so that the distance of shift of the bar 48 is reduced and so that engagement of an adjacent spring clutch occurs immediately upon disengagement of the spring clutch which has been driving. To this end, the several spring lifters 50 are spaced along the bar 48 at intervals slightly shorter than the intervals between the buttons 46. The spring lifters 52, for the opposite ends of the springs, are similarly arranged. Thus, with the very short movement of the shifter bar 48 the several gear ratios of the system may be progressively made active with, if desired, a slight overlap in their engagements so that there is no power letdown between shifts.

In FIG. 7 still another arrangement is shown for arranging shifting. When the FIG. 7 structure is combined with that of FIG. 1—an obvious combination—it is contemplated that the system is used for uni-directional drive. Thus, there will be only one set of buttons 46, such buttons engaging the one ends only of the several spring clutches. In this embodiment the shifter bar 48 carries only a single elongated spring lifter 62, which is long enough to bridge between adjacent buttons 46 and to engage two buttons simultaneously. With this configuration, if two springs are engaged simultaneously, the slower of gears 38—41 will drive while the faster gear will overrun its spring clutch. For example, FIG. 7 shows spring clutch 27 engaged, with spring clutches 26 and 28 disengaged. If the shifter bar 48 is moved slightly to the right of its shown position button 46 for spring 28 will be pressed outwardly, urging simultaneous engagement, then, of both springs 27 and 28. However, only the slower of the two gears 39 or 40 will drive, the other overrunning. Suppose gear 39 is the slower; then gear 40 will overrun. As soon as the shifter is moved to the right to disengage the button 46 for spring 27, the drive will be through the spring 28, since button 46 for that spring is pressed outwardly.

In similar fashion, the bar 48 can be moved into and out of the shaft 23 progressively to engage or disengage the several spring clutches of the system.

The several clutch springs are preferably wound to a free diameter so that they wrap down on shaft 23 lightly. Thus, they will always be disengaged from driving relation with the embracing member, unless the end buttons are moved radially outwardly to enforce triggering frictional engagement of the spring ends with the embracing member. The bearings 42 hold their gear members coaxial with shaft 23 to avoid inadvertent clutch spring energization. Other means of piloting for the gear members 38—41 could be used, such as forming the abutment members 31 as bushings upon which the gear members are borne, with the contracted outside diameter of the clutch springs being slightly less than the inside diameter of the members.

While the arrangement of the drawings shows four step ratios in the gearset, it is clear that a greater or a lesser number may be incorporated, depending upon requirements. It should also be noted that the specific structural arrangements for gear mountings, bar, etc. are capable of design modification without departing from the spirit or scope of the invention. It is feasible, using the principles of this invention, to have a large nest of gears with small ratio differences between them, but still arranged in very compact fashion. The clutching arrangement through the operation of the bar 48 enables rapid speed ratio transition from one end of the range of the other in progressive fashion, enabling, for instance, rapid acceleration or deceleration of a load.

It is believed that this invention is capable of considerable change and modification and it is intended that the following claims embrace all such modifications and changes.

We claim:

1. A transmission comprising a drive shaft having spaced radially projecting abutments thereon, a helical spring embracing said shaft between a pair of abutments, the spring length being so chosen that one or the other end thereof engages one or the other of said abutments when said drive shaft rotates, a rotatable annular transmission member embracing said shaft and spring, and having a smooth bore concentric with said shaft, and means associated with the shaft operable to enforce outward radial movement of both ends of said spring concurrently to engage both said ends with the bore of said annular member and thereby establish a driving connection between the input shaft and said transmission member through the spring and one or the other of the abutments of said pair depending upon the direction of rotation of said shaft.

2. A transmission as defined in claim 1 wherein said operable means includes a stiff resilient element for each of the ends of said spring for concurrently urging the spring ends outwardly.

3. A transmission comprising a drive shaft having several radially projecting abutments thereon, a helical spring between each of a pair of abutments and embracing said shaft, the spring lengths being so chosen that one or the other end of each spring engages one or the other of the abutments of a pair when said drive shaft rotates, a plurality of rotatable annular transmission members each of which embraces said shaft and a spring, each said annular transmission member having a smooth bore concentric with said shaft, and means associated with the shaft operable to enforce outward radial movement of both ends of any one of said springs concurrently to engage both said ends with the bore of the embracing annular member and thereby establish a driving connection between the input shaft and such annular member through the actuated spring and one or the other of the abutments between which the actuated spring is disposed depending upon the direction of rotation of the shaft.

References Cited in the file of this patent

UNITED STATES PATENTS

| 2,378,954 | Swift | June 26, 1945 |
| --- | --- | --- |
| 2,705,065 | Kloss | Mar. 29, 1955 |

FOREIGN PATENTS

| 600,383 | France | Feb. 5, 1926 |
| --- | --- | --- |

OTHER REFERENCES

Germany, G 14, 730 II/63K, Oct. 31, 1956.